US009483995B2

(12) United States Patent
Toyomura et al.

(10) Patent No.: US 9,483,995 B2

(45) Date of Patent: *Nov. 1, 2016

(54) DISPLAY DEVICE, METHOD FOR DRIVING THE SAME, AND ELECTRONIC DEVICE

(71) Applicant: Sony Corporation, Tokyo (JP)

(72) Inventors: Naobumi Toyomura, Tokyo (JP); Katsuhide Uchino, Tokyo (JP)

(73) Assignee: JOLED INC., Tokyo (JP)

( * ) Notice: Subject to any disclaimer, the term of this patent is extended or adjusted under 35 U.S.C. 154(b) by 267 days.

This patent is subject to a terminal disclaimer.

(21) Appl. No.: 14/177,859

(22) Filed: Feb. 11, 2014

(65) Prior Publication Data

US 2014/0168286 A1 Jun. 19, 2014

Related U.S. Application Data

(63) Continuation of application No. 13/847,923, filed on Mar. 20, 2013, now Pat. No. 8,723,767, which is a continuation of application No. 12/498,498, filed on Jul. 7, 2009, now Pat. No. 8,405,586.

(30) Foreign Application Priority Data

Jul. 17, 2008 (JP) ................................ 2008-185500

(51) Int. Cl.

*H01S 3/14* (2006.01)
*G09G 5/00* (2006.01)
*G09G 3/32* (2016.01)

(52) U.S. Cl.

CPC ............ *G09G 5/001* (2013.01); *G09G 3/3233* (2013.01); *G09G 3/3266* (2013.01); *G09G 2300/0819* (2013.01); *G09G 2300/0842* (2013.01); *G09G 2300/0866* (2013.01); *G09G 2320/043* (2013.01); *G09G 2320/045* (2013.01); *G09G 2330/02* (2013.01)

(58) Field of Classification Search

CPC ........................................................ H01S 3/14

See application file for complete search history.

(56) References Cited

U.S. PATENT DOCUMENTS

| | | | | |
|---|---|---|---|---|
| 8,723,767 | B2 * | 5/2014 | Toyomura et al. | 345/82 |
| 2003/0112205 | A1 * | 6/2003 | Yamada | 345/32 |
| 2004/0174349 | A1 | 9/2004 | Libsch et al. | |
| 2008/0272998 | A1 | 11/2008 | Yano et al. | |

FOREIGN PATENT DOCUMENTS

| | | |
|---|---|---|
| JP | 2008-083272 | 4/2008 |
| JP | 2009-271320 | 11/2009 |

OTHER PUBLICATIONS

Japanese Patent office Action for Japanese Application No. 2008-185500 dated Jul. 1, 2010.

* cited by examiner

*Primary Examiner* — Amare Mengistu
*Assistant Examiner* — Shawna Stepp Jones
(74) *Attorney, Agent, or Firm* — Dentons US LLP

(57) ABSTRACT

A display device including a display unit including first and second lines, light emitting elements and pixel circuits; a first drive unit sequentially applying a selection pulse to the first lines; and a second drive unit applying a signal pulse including first to third voltages to each of the second lines. Each of the pixel circuits includes a first transistor sampling the signal pulse, and a second transistor driving one of the light emitting elements. The first drive unit applies the selection pulse when the first voltage is being applied by the second drive unit, before a correction of a threshold voltage of the second transistor is initiated and within a period that the one of the light emitting elements is being turned out, and the first drive unit applies the selection pulse when the second voltage is being applied by the second drive unit.

22 Claims, 9 Drawing Sheets

DISPLAY DEVICE, METHOD FOR DRIVING THE SAME, AND ELECTRONIC DEVICE

RELATED APPLICATION DATA

This application is a continuation of U.S. patent application Ser. No. 13/847,923 filed Mar. 20, 2013, which is a continuation of U.S. patent application Ser. No. 12/498,498 filed Jul. 7, 2009 now U.S. Pat. No. 8,405,586 issued Mar. 26, 2013, the entireties of both of which are incorporated herein by reference to the extent permitted by law. The present application claims the benefit of priority to Japanese Patent Application No. JP 2008-185500 filed on Jul. 17, 2008 in the Japan Patent Office, the entirety of which is incorporated by reference herein to the extent permitted by law.

BACKGROUND OF THE INVENTION

1. Field of the Invention

The present invention relates to a display device including a display unit having a light emitting element and a pixel circuit for each of pixels, and a drive unit for driving the pixel circuit, and to a method for driving the same. The present invention also relates to an electronic device having the display device.

2. Description of the Related Art

In recent years, in the field of a display device for displaying an image, a display device using, as a light emitting element of a pixel, an optical element of a current driving type whose light emission luminance changes according to a value of a flowing current, for example, an organic EL (Electro Luminance) element, is developed and is being commercialized.

The organic EL element is a spontaneous light emitting element unlike a liquid crystal element or the like. Thus, in a display device using an organic EL element (organic EL display device), a light source (backlight) is unnecessary. Therefore, as compared with a liquid crystal display device necessitating a light source, visibility of an image is higher, power consumption is lower, and response of the element is faster.

As driving methods of the organic EL display device, as in the liquid crystal display device, there are a simple (passive) matrix method and an active matrix method. The simple (passive) matrix method has, although a structure is simple, a disadvantage in that a large-sized high-resolution display device is difficult to be realized. Consequently, at present, the active matrix method is actively developed. In the active matrix method, current flowing in a light emitting element disposed for each pixel is controlled by an active element (generally, TFT (Thin Film Transistor)) provided in a drive circuit arranged for each of the light emitting elements.

Generally, a current-voltage (I-V) characteristic of the organic EL element deteriorates with time (time-dependent degradation). In a pixel circuit for current-driving the organic EL element, when the I-V characteristic of the organic EL element changes with time, a voltage dividing ratio between the organic EL element and a drive transistor connected in series with the organic EL element changes, so that a voltage Vgs between a gate and a source of the drive transistor also changes. As a result, a value of current flowing in the drive transistor changes, so that a value of current flowing in the organic EL element also changes, and light emission luminance also changes according to the current value.

In addition, there is a case that a threshold voltage Vth and mobility μ of the drive transistor change with time, or differ among the pixel circuits due to variations in manufacturing processes. In a case where the threshold voltage Vth and mobility μ of the drive transistor differ among the pixel circuits, the value of current flowing in the drive transistor varies among pixel circuits. Consequently, even when the same voltage is applied to the gate of the drive transistor, the light emission luminance of the organic EL element varies, and uniformity of a screen deteriorates.

Accordingly, a display device is developed, which has a function of compensating fluctuations in the I-V characteristic of the organic EL element and a function of correcting fluctuations in the threshold voltage Vth and the mobility μ of the drive transistor, in order to maintain the light emission luminance of the organic EL element without being influenced by the variations with time in the I-V characteristic of the organic EL element and the variations with time in the threshold voltage Vth and the mobility μ of the drive transistor (see, for example, Japanese Unexamined Patent Application Publication No. 2008-083272).

FIG. 10 illustrates a schematic configuration of a display device described in JP2008-083272A. A display device 100 illustrated in FIG. 10 has a display unit 110 in which a plurality of pixels 120 are disposed in a matrix, and a drive unit (a horizontal drive circuit 130, a write scan circuit 140, and a power source scan circuit 150) for driving each of the pixels 120.

Each of the pixels 120 includes a pixel 120R for red, a pixel 120G for green, and a pixel 120B for blue. As illustrated in FIG. 11, each of the pixels 120R, 120G, and 120B includes an organic EL element 121 (organic EL elements 121R, 121G, and 121B) and a pixel circuit 122 connected to the organic EL element 121. The pixel circuit 122 includes a transistor $T_{WS}$ for sampling, a retention capacitor Cs, and a transistor $T_{Dr}$ for driving, and has a circuit configuration of 2Tr1C. A gate line WSL led from the write scan circuit 140 is formed to extend in a row direction and is connected to a gate of the transistor $T_{WS}$. A drain line DSL led from the power source scan circuit 150 is also formed to extend in the row direction, and is connected to a drain of the transistor $T_{Dr}$. A signal line DTL led from the horizontal drive circuit 130 is formed to extend in a column direction, and is connected to a drain of the transistor $T_{WS}$. A source of the transistor $T_{WS}$ is connected to a gate of the transistor $T_{Dr}$ for driving and to one end of the retention capacitor Cs. A source of the transistor $T_{Dr}$ and the other end of the retention capacitor Cs are connected to an anode of the organic EL element 121R, 121G, or 121B (hereinbelow, simply referred to as an "organic EL element 121R or the like"). A cathode of the organic EL element 121R or the like is connected to a ground line GND.

FIG. 12 represents an example of various waveforms in the display device 100 illustrated in FIG. 10. FIG. 12 represents a state where two kinds of voltages (Von and Voff (<Von)) are applied to the gate line WSL, two kinds of voltages (Vcc and Vini (<Vcc)) are applied to the drain line DSL, and two kinds of voltages (Vsig and Vofs (<Vsig)) are applied to the signal line DTL. Further, FIG. 12 represents a state where a gate voltage Vg and a source voltage Vs of the transistor $T_{Dr}$ change momentarily in accordance with application of the voltages to the gate line WSL, the drain line DSL and the signal line DTL.

[Vth Correction Preparation Period]

First, Vth correction is prepared. Specifically, the power source scan circuit 150 decreases the voltage of the drain line DSL from Vcc to Vini ($T_1$). As a result, the source voltage Vs decreases to Vini, and light of the organic EL element 121 or the like goes out. At this time, the gate voltage Vg also decreases due to coupling via the retention capacitor Cs. Next, while the voltage of the signal line DTL is Vofs, the write scan circuit 140 increases the voltage of the gate line WSL from Voff to Von ($T_2$). As a result, the gate voltage Vg decreases to Vofs.

[First Vth Correction Period]

Next, Vth is corrected. Specifically, while the voltage of the signal line DTL is Vofs, the power source scan circuit 150 increases the voltage of the drain line DSL from Vini to Vcc ($T_3$). As a result, current Ids flows between the drain and the source of the transistor $T_{Dr}$, and the source voltage Vs rises. After that, before the horizontal drive circuit 130 switches the voltage of the signal line DTL from Vofs to Vsig, the write scan circuit 140 decreases the voltage of the gate line WSL from Von to Voff ($T_4$). As a result, the gate of the transistor $T_{Dr}$ floats, and correction of Vth is temporarily stopped.

[First Vth Correction Stop Period]

In a period in which the Vth correction is stopped, the voltage of the signal line DTL is sampled in another row (pixel) different from a row (pixel) in which the Vth correction is performed. In a case where the Vth correction is insufficient, that is, in the case where a potential difference Vgs between the gate and the source of the transistor $T_{Dr}$ is larger than the threshold voltage Vth of the transistor $T_{Dr}$, the current Ids flows between the drain and the source of the transistor $T_{Dr}$ and thus the source voltage Vs rises also in the Vth correction stop period in the row (pixel) in which the Vth correction is performed earlier, and the gate voltage Vg also rises by the coupling via the retention capacitor Cs.

[Second Vth Correction Period]

After completion of the Vth correction stop period, Vth is corrected again. Specifically, when the voltage of the signal line DTL is Vofs and Vth correction is possible, the write scan circuit 140 increases the voltage of the gate line WSL from Voff to Von ($T_5$) and connects the gate of the transistor $T_{Dr}$ to the signal line DTL. At this time, in a case where the source voltage Vs is lower than Vofs−Vth (in the case where the Vth correction has not been completed), the current Ids flows between the drain and the source of the transistor $T_{Dr}$ until the transistor $T_{Dr}$ cuts off (until the voltage difference Vgs becomes Vth). As a result, the retention capacitor Cs is charged to Vth, and the potential difference Vgs becomes Vth. After that, before the horizontal drive circuit 130 switches the voltage of the signal line DTL from Vofs to Vsig, the write scan circuit 140 decreases the voltage of the gate line WSL from Von to Voff ($T_6$). As a result, the gate of the transistor $T_{Dr}$ floats so that the potential difference Vgs is maintained at Vth irrespective of the magnitude of the voltage of the signal line DTL. In this way, by setting the potential difference Vgs to Vth, light emission luminance of the organic EL elements 121 or the like is prevented from varying even when the threshold voltage Vth of the transistor $T_{Dr}$ is varied among the pixel circuits 122.

[Second Vth Correction Stop Period]

Thereafter, in the Vth correction stop period, the horizontal drive circuit 130 switches the voltage of the signal line DTL from Vofs to Vsig.

[Write and μ Correction Period]

After completion of the Vth correction stop period, writing and μ correction are performed. Specifically, while the voltage of the signal line DTL is Vsig, the write scan circuit 140 increases the voltage of the gate line WSL from Voff to Von ($T_7$) and connects the gate of the transistor $T_{Dr}$ to the signal line DTL. As a result, the voltage of the gate of the transistor $T_{Dr}$ becomes Vsig. At this time, the voltage of the anode of the organic EL element 121R or the like is smaller than threshold voltage Vel of the organic EL element 121R or the like at this stage, and the organic EL element 121R or the like is cut off. Consequently, the current Ids flows to an element capacitor (not illustrated) of the organic EL element 121R or the like, and the element capacitor is charged. Thus, the source voltage Vs rises by ΔV, and eventually the potential difference Vgs becomes Vsig+Vth−ΔV. In this way, the μ correction is performed at the same time with the writing. Here, the larger the mobility μ of the transistor $T_{Dr}$ is, the larger ΔV becomes. Therefore, by decreasing the potential difference Vgs by ΔV before the light emission, the variations in the mobility μ per pixel is eliminated.

[Light Emission]

Finally, the write scan circuit 140 decreases the voltage of the gate line WSL from Von to Voff ($T_8$). As a result, the gate of the transistor $T_{Dr}$ floats, the current Ids flows between the drain and the source of the transistor $T_{Dr}$, and the source voltage Vs rises. Consequently, the organic EL element 121R or the like emits light with desired luminance.

SUMMARY OF THE INVENTION

In the above-described Vth correction preparation period, the source voltage Vs is set to a negative potential to cause the potential difference Vgs of the transistor $T_{Dr}$ to exceed Vth. Therefore, reverse bias is continuously applied to the organic EL element 121R or the like in this period. Although the period in which the reverse bias is continuously applied varies according to a duty ratio of a light-on period and a light-off period (light-on period/light-off period×100), in a case for example where the duty ratio is 25%, the reverse bias is continuously applied to the organic EL element 121R or the like for a period of up to 75% of one cycle.

Generally, the probability of occurrence of breakdown (black dots) when the reverse bias is applied to the organic EL element becomes higher as the magnitude of the reverse bias and application time increase. Therefore, when the large reverse bias is continuously applied to the organic EL element 121R or the like for a long time, there is a high possibility that the organic EL element 121R or the like causes the black dots, and the yield drop may occur.

It is therefore desirable to provide a display device capable of reducing the possibility of occurrence of black dots, a method of driving the same, and an electronic device.

A display device according to an embodiment of the present invention includes: a display unit having a plurality of first lines arranged in rows, a plurality of second lines arranged in columns, a plurality of light emitting elements arranged in the rows and the columns, and a plurality of pixel circuits arranged in the rows and the columns; a first drive unit sequentially applying a selection pulse to the plurality of first lines; and a second drive unit applying a signal pulse including a first voltage, a second voltage, and a third voltage to each of the second lines, the first voltage being higher in voltage than the second voltage, and the third voltage corresponding to a video signal. Each of the pixel circuits includes a first transistor sampling the signal pulse, and a second transistor driving corresponding one of the light emitting elements. The first drive unit applies the selection pulse to the first lines when the first voltage is being applied to each of the second lines by the second drive unit, before a correction of a threshold voltage of the second transistor is initiated and within a period in which the corresponding one of the light emitting elements is being turned out, and the first drive unit thereafter applies the selection pulse to the first lines when the second voltage is being applied to each of the second lines by the second drive unit.

A display device driving method according to an embodiment of the present invention includes the steps of: preparing a display device including: a display unit having a plurality of first lines arranged in rows, a plurality of second lines arranged in columns, a plurality of light emitting elements arranged in the rows and the columns, and a plurality of pixel circuits arranged in the rows and the columns; a first drive unit sequentially applying a selection pulse to the plurality of first lines; and a second drive unit applying a signal pulse having a first voltage, a second voltage, and a third voltage to each of the second lines, the first voltage being higher in voltage than the second voltage, and the third voltage corresponding to a video signal, each of the pixel circuits has a first transistor sampling the signal pulse, and a second transistor driving corresponding one of the light emitting elements; applying, by utilizing the first drive unit of the display device, the selection pulse to the first lines when the first voltage is being applied to each of the second lines by the second drive unit, before a correction of a threshold voltage of the second transistor is initiated and within a period in which the corresponding one of the light emitting elements is being turned out; and applying, by utilizing the first drive unit of the display device, the selection pulse to the first lines when the second voltage is being applied to each of the second lines by the second drive unit.

An electronic device according to an embodiment of the present invention includes a displaying device having: a display unit including a plurality of first lines arranged in rows, a plurality of second lines arranged in columns, a plurality of light emitting elements arranged in the rows and the columns, and a plurality of pixel circuits arranged in the rows and the columns; a first drive unit sequentially applying a selection pulse to the plurality of first lines; and a second drive unit applying a signal pulse having a first voltage, a second voltage, and a third voltage to each of the second lines, the first voltage being higher in voltage than the second voltage, and the third voltage corresponding to a video signal. Each of the pixel circuits has a first transistor sampling the signal pulse, and a second transistor driving corresponding one of the light emitting elements. The first drive unit applies the selection pulse to the first lines when the first voltage is being applied to each of the second lines by the second drive unit, before a correction of a threshold voltage of the second transistor is initiated and within a period in which the corresponding one of the light emitting elements is being turned out, and the first drive unit thereafter applies the selection pulse to the first lines when the second voltage is being applied to each of the second lines by the second drive unit.

In the display device, the method for driving the same, and the electronic device according to the embodiments of the present invention, the selection pulse is applied to the first lines when the first voltage is being applied to each of the second lines by the second drive unit before a correction of a threshold voltage of the second transistor is initiated and within a period in which the one of the light emitting elements is being turned out, and thereafter, the selection pulse is applied to the first lines when the second voltage is being applied to each of the second lines by the second drive unit. Thereby, a period in which a large reverse bias is applied to the light emitting element becomes short.

According to the display device, the method for driving the same, and the electronic device of the embodiments of the present invention, the period in which the large reverse bias is applied to the light emitting element, before the correction of the threshold voltage of the second transistor is initiated and within the period in which the one of the light emitting elements is being turned out, is short. Therefore, it is possible to reduce the possibility of occurrence of black dots.

Other and further objects, features and advantages of the invention will appear more fully from the following description.

DETAILED DESCRIPTION OF THE PREFERRED EMBODIMENTS

Embodiments of the present invention will be described in detail hereinbelow with reference to the drawings.

Figure 1:
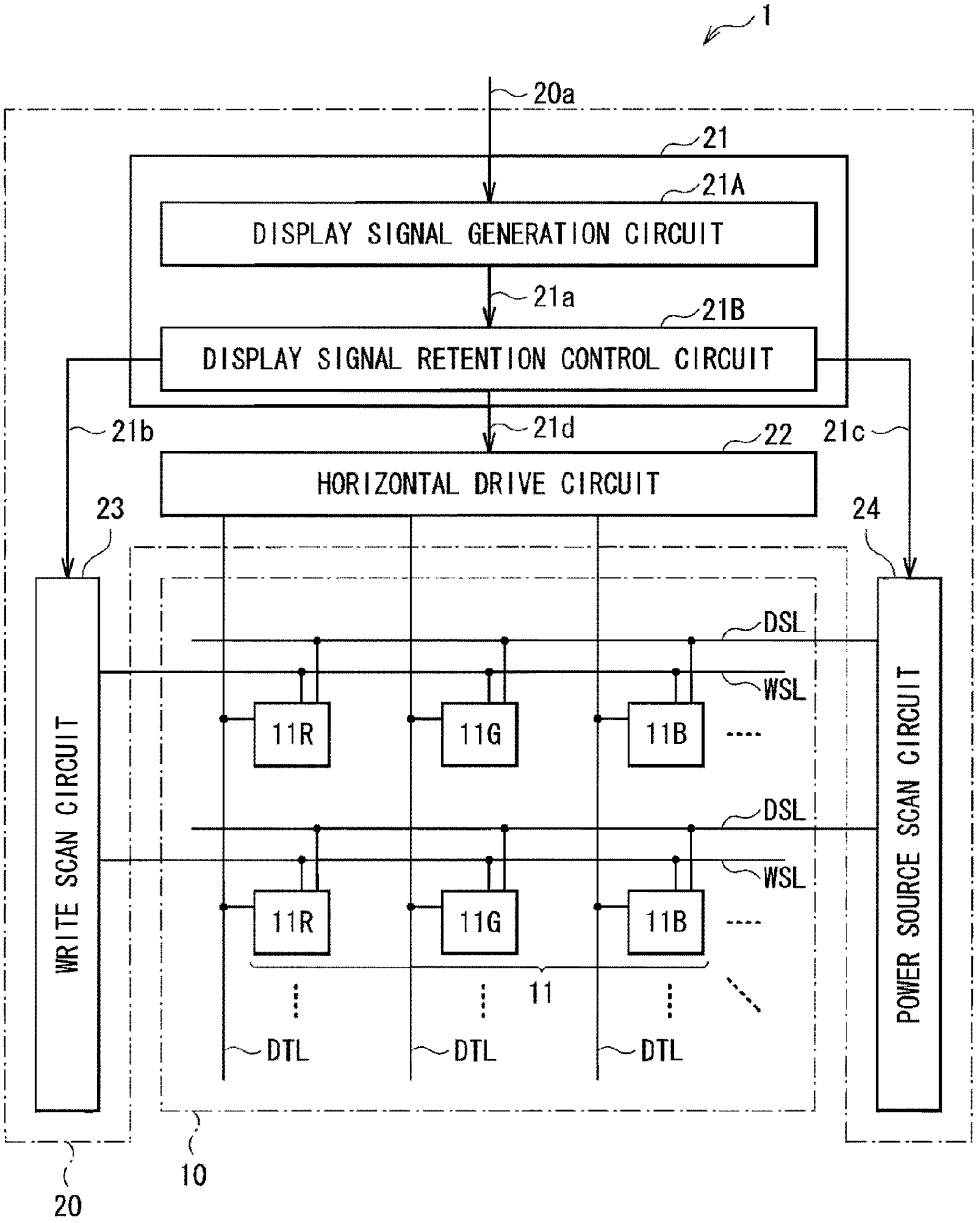
FIG. 1 illustrates an example of a configuration of a display device according to an embodiment of the present invention.

FIG. 1 illustrates an example of a general configuration of a display device 1 according to an embodiment of the present invention. The display device 1 has, on a substrate (not illustrated) made of, for example, glass, silicon (Si) wafer, a resin, or the like, a display unit 10 and a peripheral circuit unit 20 (drive unit) formed in the periphery of the display unit 10.

The display unit 10 has a configuration in which a plurality of pixels 11 are arranged in a matrix on an entire surface of the display unit 10, and displays an image based on a video signal 20*a* input from the outside by active matrix drive. Each pixel 11 includes a pixel 11R for red, a pixel 11G for green, and a pixel 11B for blue.

Figure 2:
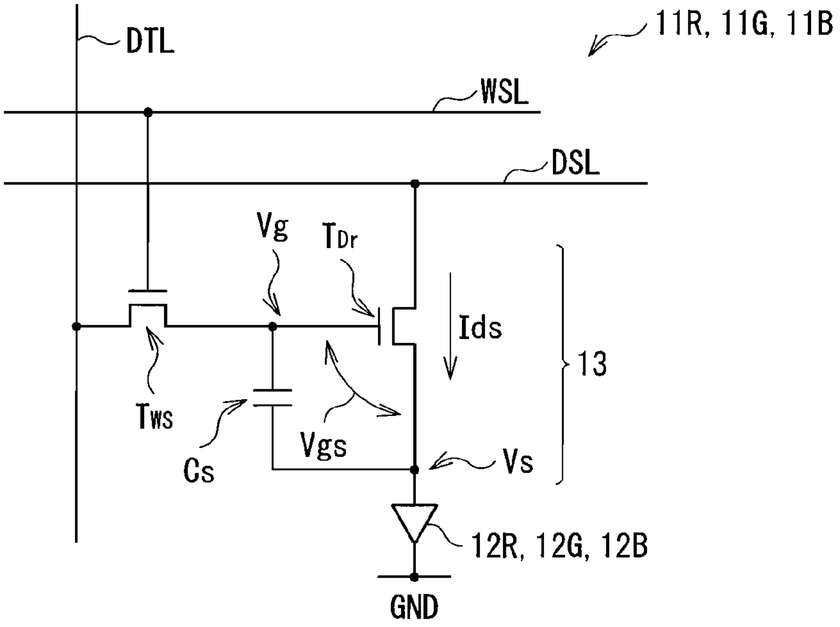
FIG. 2 illustrates an example of an internal configuration of a pixel in FIG. 1.

FIG. 2 illustrates an example of an internal configuration of the pixels 11R, 11G, and 11B. The pixels 11R, 11G, and 11B have therein organic EL elements 12R, 12G, 12B (light emitting elements), respectively, and a pixel circuit 13.

Each of the organic EL elements 12R, 12G, and 12B (hereinbelow simply referred to as the "organic EL element 12R or the like") has, for example, although not illustrated, a configuration in which an anode, an organic layer, and a cathode are stacked on a substrate 11 in order therefrom. The organic layer has a stack-layer structure in which, for example, a hole injection layer for increasing hole injection efficiency, a hole transport layer for increasing hole transport efficiency to a light emission layer, a light emission layer for generating light emission by recombination of electrons and holes, and an electron transport layer for increasing efficiency of transporting the electrons to the light emission layer, are stacked in order from the side of the anode.

The pixel circuit 13 includes a transistor $T_{WS}$ for sampling (first transistor), a retention capacitor Cs, and a transistor $T_{Dr}$ for driving (second transistor), and has a circuit configuration of 2Tr1C. Each of the transistors $T_{WS}$ and $T_{Dr}$ is configured by, for example, an n-channel MOS-type thin film transistor (TFT).

The peripheral circuit unit 20 has a timing control circuit 21, a horizontal drive circuit 22, a write scan circuit 23, and a power source scan circuit 24. The timing control circuit 21 includes a display signal generation circuit 21A and a display signal retention control circuit 21B. The peripheral circuit unit 20 also includes a gate line WSL, a drain line DSL, a signal line DTL, and a ground line GND. The ground line is connected to the ground and is set at ground voltage.

The display signal generation circuit 21A generates, on the basis of the video signal 20*a* input from the outside, a display signal 21*a* for displaying an image on the display unit 10, for example, screen by screen (field by field).

The display signal retention control circuit 21B stores and retains the display signal 21*a* output from the display signal generation circuit 21A in a field memory configured by, for example, an SRAM (Static Random Access Memory), screen by screen (field by field). The display signal retention control circuit 21B also plays a role of controlling the horizontal drive circuit 22, the write scan circuit 23, and the power source scan circuit 24 which drive the pixels 11, such that they operate interlockingly. Specifically, the display signal retention control circuit 21B outputs a control signal 21*b* to the write scan circuit 23, outputs a control signal 21*c* to the power source scan circuit 24, and outputs a control signal 21*d* to the display signal drive circuit 21C.

The horizontal drive circuit 22 is possible to output three kinds of voltages (Vofs1, Vofs2, and Vsig) in accordance with the control signal 21*d* output from the display signal retention control circuit 21B. Specifically, the horizontal drive circuit 22 supplies the three kinds of voltages (Vofs1, Vofs2, and Vsig) to the pixel 11 selected by the write scan circuit 23, via the signal line DTL connected to the pixels 11 in the display unit 10.

Here, Vofs1 has a voltage value higher than Vofs2. Vsig has a voltage value corresponding to the video signal 20*a*. The minimum voltage of Vsig has a voltage value lower than Vofs, and the maximum voltage of Vsig has a voltage value higher than Vofs.

The write scan circuit 23 is possible to output two kinds of voltages (Von and Voff) in accordance with the control signal 21*b* output from the display signal retention control circuit 21B. Specifically, the write scan circuit 23 supplies the two kinds of voltages (Von and Voff) to the pixel 11 to be driven, via the gate line WSL connected to the pixels 11 in the display unit 10, and controls the transistor $T_{WS}$ for sampling.

Here, Von has a value equal to or higher than the on-voltage of the transistor $T_{WS}$. Von has a voltage value output from the write scan circuit 23, for example, in a "first Vth correction period" and a "write and μ correction period", which will be described later. Voff has a value lower than the on-voltage of the transistor $T_{WS}$ and is also a value lower than Von. Voff has a voltage value output from the write scan circuit 23, for example, in a "Vth correction stop period" and a "light emission period", which will be described later.

The power source scan circuit 24 is possible to output two kinds of voltages (Vini and Vcc) in accordance with the control signal 21*c* output from the display signal retention control circuit 21B. Specifically, the power source scan circuit 24 supplies the two kinds of voltages (Vini and Vcc) to the pixel 11 to be driven, via the drain line DSL connected to the pixels 11 of the display unit 10, and controls light-on and light-off of the organic EL element 12R or the like.

Vini has a voltage value lower than a voltage (Vel+Vca) obtained by adding the threshold voltage Vel of the organic EL element 12R or the like and the voltage Vca of the cathode of the organic EL element 12R or the like. Vcc has a voltage value equal to or higher than the voltage (Vel+Vca).

Next, with reference to FIG. 2, a connection relationship of the components will be described. The gate line WSL led from the write scan circuit 23 is formed to extend in a row direction and is connected to a gate of the transistor $T_{WS}$. The drain line DSL led from the power source scan circuit 24 is also formed to extend in the row direction and is connected to a drain of the transistor $T_{Dr}$. The signal line DTL led from the horizontal drive circuit 22 is formed to extend in a column direction and is connected to a drain of the transistor $T_{WS}$. A source of the transistor $T_{WS}$ is connected to a gate of the transistor $T_{Dr}$ for driving and to one end of the retention capacitor Cs. A source of the transistor $T_{Dr}$ and the other end of the retention capacitor Cs are connected to the anode of the organic EL element 12R or the like. The cathode of the organic EL element 12R or the like is connected to the ground line GND.

Next, the operation (operation from light-off to light-on) of the display device 1 according to the embodiment will be described. In the present embodiment, an operation of compensating fluctuations in the I-V characteristic of the organic EL element 12R or the like and an operation of correcting fluctuations in the threshold voltage Vth and mobility μ of the transistor $T_{Dr}$ are included, in order to maintain the light emission luminance of the organic EL element 12R or the like constant without being influenced by variations with time in the I-V characteristic of the organic EL element 12R or the like and variations with time in the threshold voltage Vth and the mobility μ of the transistor $T_{Dr}$.

Figure 3:
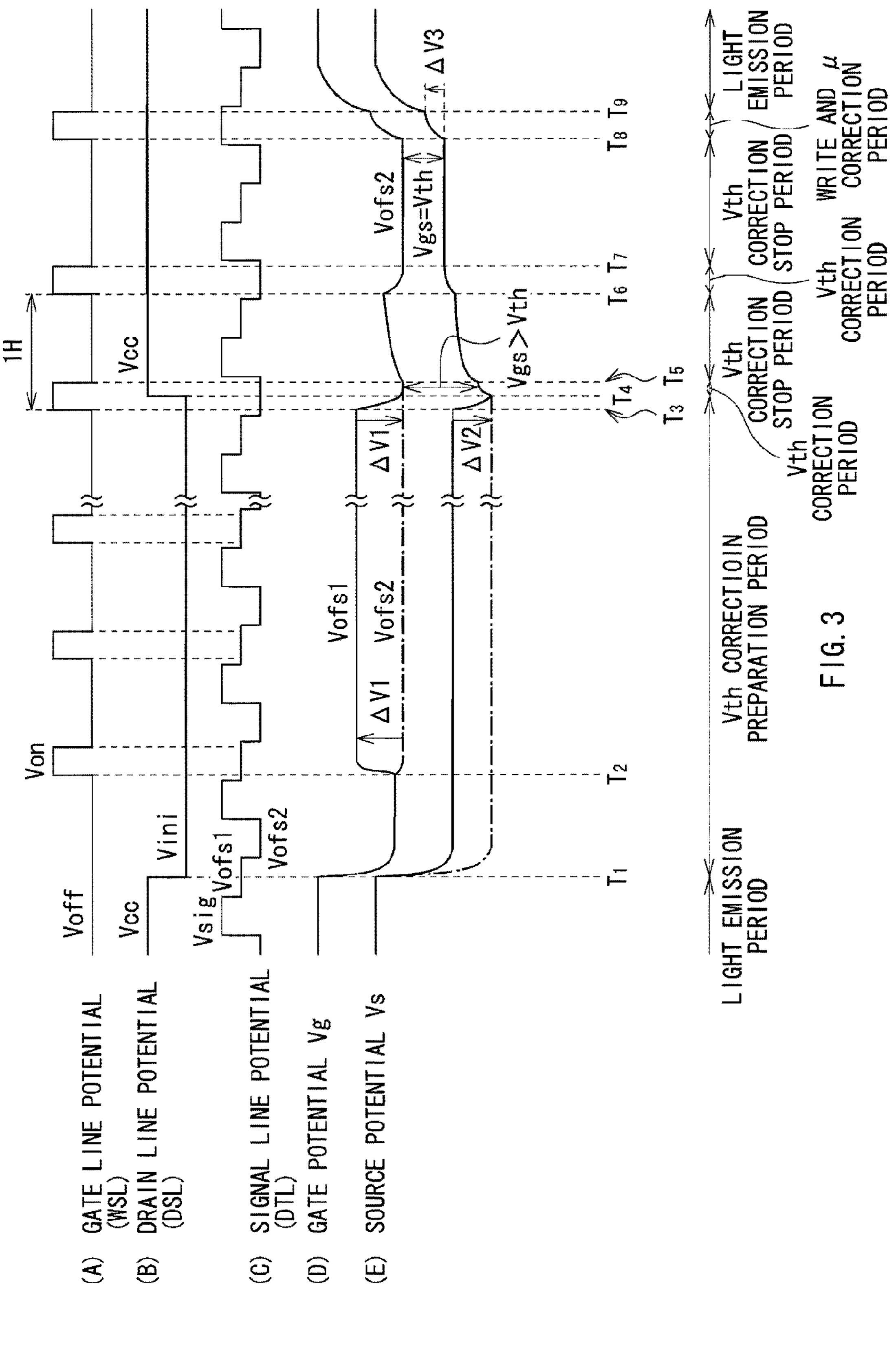
FIG. 3 is a waveform chart for explaining an example of the operation of the display device of FIG. 1.

FIG. 3 illustrates an example of various waveforms in the display device 1. FIG. 3 represents a state where the two kinds of voltages (Von and Voff) are applied to the gate line WSL, the two kinds of voltages (Vcc and Vini) are applied to the drain line DSL, and the three kinds of voltages (Vsig, Vofs1, and Vofs2) are applied to the signal line DTL. FIG. 3 also represents a state where a gate voltage Vg and a source voltage Vs of the transistor $T_{Dr}$ change momentarily in accordance with application of the voltages to the gate line WSL, the drain line DSL, and the signal line DTL.

[Vth Correction Preparation Period]

First, Vth correction is prepared. Specifically, when the voltage of the gate line WSL is Voff, the voltage of the signal line DTL is Vofs1, and the voltage of the drain line DSL is Vcc (that is, the organic EL element 12R or the like emits light), the power source scan circuit 24 decreases the voltage of the drain line DSL from Vcc to Vini in accordance with the control signal 21$c$ ($T_1$). As a result, the source voltage Vs decreases to a predetermined voltage higher than Vini, and light of the organic EL element 12R or the like goes out. At this time, the gate voltage Vg also decreases to a voltage slightly higher than Vofs2 due to coupling via the retention capacitor Cs. Next, while the voltage of the drain line DSL is Vini and the voltage of the signal line DTL is Vofs1, the write scan circuit 23 increases the voltage of the gate line WSL from Voff to Von in accordance with the control signal 21$b$ ($T_2$). As a result, the gate voltage Vg rises to Vofs1, and the source voltage Vs maintains the predetermined voltage higher than Vini. After that, when the voltage of the drain line DSL is Vini and the voltage of the signal line DTL is Vofs2, the write scan circuit 23 increases the voltage of the gate line WSL from Voff to Von in accordance with the control signal 21$b$ ($T_3$). As a result, the gate voltage Vg decreases to Vofs2 and, accordingly, the source voltage Vs also decreases to Vini.

Here, a fluctuation amount ΔV1 of the gate voltage Vg is approximately Vofs1−Vofs2. On the other hand, a fluctuation amount ΔV2 of the source voltage Vs is determined by a magnitude of the retention capacitor Cs and coupling capacitance of element capacitance of the organic EL element 12R or the like, and by a fluctuation amount of the gate voltage Vg, as represented by a following equation. Therefore, a magnitude of ΔV2 is adjustable by changing an increase amount of the coupling capacitance or the gate voltage Vg. In the following equation, Cel denotes the coupling capacitance of the element capacitance of the organic EL element 12R or the like.

$$\Delta V2=(Vofs1-Vofs2)\times(1-Cs/(Cs+Cel))$$

For example, in a case where the first term (Vofs1−Vofs2) in the right side of the equation is 10 and the second term (1−Cs/(Cs+Cel)) in the right side is 0.2, ΔV2=10×0.2=2 volts is established.

Accordingly, in the present embodiment, the source voltage Vs is higher in voltage than Vini for a predetermined time (during the period in which the gate voltage Vg is Vofs1) in the Vth correction preparation period. Therefore, as compared with the case where the source voltage Vs is continuously Vini in the Vth correction preparation period (refer to FIG. 3), the period in which the source voltage Vs is Vini is shorter.

In the power source scan circuit 24 and the horizontal drive circuit 22, the voltages (Vini and Vofs) applied to the drain line DSL and the signal line DTL are set so that the potential difference Vgs (=Vofs−Vini) between the gate voltage Vg and the source voltage Vs becomes larger than the threshold voltage Vth of the transistor $T_{Dr}$.

[First Vth Correction Period]

Next, Vth is corrected. Specifically, while the voltage of the signal line DTL is Vofs2, the power source scan circuit 24 increases the voltage of the drain line DSL from Vini to Vcc in accordance with the control signal 21$c$ ($T_4$). As a result, current Ids flows between the drain and the source of the transistor $T_{Dr}$, and the source voltage Vs rises. Thereafter, before the horizontal drive circuit 22 switches the voltage of the signal line DTL from Vofs2 to Vsig in accordance with the control signal 21$d$, the write scan circuit 23 decreases the voltage of the gate line WSL from Von to Voff in accordance with the control signal 21$b$ ($T_5$). As a result, the gate of the transistor $T_{Dr}$ floats, and correction of Vth is temporarily stopped.

[First Vth Correction Stop Period]

In a period in which Vth correction is stopped (that is, the voltage of the gate line WSL is Voff and the voltage of the drain line DSL is Vcc), the voltage of the signal line DTL is sampled in another row (pixel) different from a row (pixel) in which the Vth correction is performed. Specifically, the horizontal drive circuit 22 switches the voltage of the signal line DTL from Vofs to Vsig during the period in which the Vth correction is stopped and, thereafter, performs an operation of switching the voltage from Vsig to Vofs1 and Vofs2 step by step. In addition, during the period in which the voltage of the signal line DTL is Vsig, Vofs1, or Vofs2, the write scan circuit 23 increases the voltage of the gate line WSL connected to another row (pixel) different from the row (pixel) in which the Vth correction is performed earlier from Voff to Von and, thereafter, switches the voltage from Von to Voff.

In a case where the Vth correction is insufficient, that is, in the case where the potential difference Vgs between the gate and the source of the transistor $T_{Dr}$ is larger than the threshold voltage Vth of the transistor $T_{Dr}$, the current Ids flows between the drain and the source of the transistor $T_{Dr}$ and thus the source voltage Vs rises also in the Vth correction stop period in the row (pixel) in which the Vth correction is performed earlier, and the gate voltage Vg also rises by the coupling via the retention capacitor Cs.

[Second Vth Correction Period]

After completion of the Vth correction stop period, Vth is corrected again. Specifically, when the voltage of the drain line DSL is Vcc and the voltage of the signal line DTL is Vofs2, and that the Vth correction is possible, the write scan circuit 23 increases the voltage of the gate line WSL from Voff to Von in accordance with the control signal 21$b$ ($T_6$) and connects the gate of the transistor $T_{Dr}$ to the signal line DTL. At this time, in a case where the source voltage Vs is lower than Vofs−Vth (in the case where the Vth correction has not been completed), the current Ids flows between the drain and the source of the transistor $T_{Dr}$ until the transistor $T_{Dr}$ cuts off (until the voltage difference Vgs becomes Vth). Consequently, the gate voltage Vg becomes Vofs2 and the source voltage Vs rises. As a result, the retention capacitor Cs is charged to Vth, and the potential difference Vgs becomes Vth. Thereafter, before the horizontal drive circuit 22 switches the voltage of the signal line DTL from Vofs2 to Vsig, the write scan circuit 23 decreases the voltage of the gate line WSL from Von to Voff ($T_7$). As a result, the gate of the transistor $T_{Dr}$ floats, so that the potential difference Vgs is maintainable at Vth irrespective of the magnitude of the voltage of the signal line DTL. Therefore, by setting the potential difference Vgs to Vth, the light emission luminance of the organic EL elements 12R or the like is prevented from varying even when the threshold voltage Vth of the transistor $T_{Dr}$ is varied among the pixel circuits 13.

[Second Vth Correction Stop Period]

Thereafter, in the Vth correction stop period (that is, in the period in which the voltage of the gate line WSL is Voff and the voltage of the drain line DSL is Vcc), the horizontal drive circuit 22 switches the voltage of the signal line DTL from Vofs2 to Vsig in accordance with the control signal 21$d$.

[Write and μ Correction Period]

After completion of the second Vth correction stop period, the writing and μ correction are performed. Specifically, while the voltage of the signal line DTL is Vsig, the write scan circuit 23 increases the voltage of the gate line WSL from Voff to Von in accordance with the control signal 21$b$ ($T_8$), and connects the gate of the transistor $T_{Dr}$ to the signal line DTL. As a result, the voltage of the gate of the transistor $T_{Dr}$ becomes the voltage Vsig of the signal line DTL. At this time, the voltage of the anode of the organic EL element 12R or the like is smaller than threshold voltage Vel of the organic EL element 12R or the like at this stage, and the organic EL element 12R or the like is cut off. Consequently, the current Ids flows to an element capacitor (not illustrated) of the organic EL element 12R or the like, and the element capacitor is charged. Therefore, the source voltage Vs rises by ΔV3, and eventually the potential difference Vgs becomes Vsig+Vth−ΔV3. In this way, the μ correction is performed at the same time with the writing. Here, the larger the mobility μ of the transistor $T_{Dr}$ is, the larger ΔV3 becomes. Therefore, by decreasing the potential difference Vgs by ΔV3 before the light emission, the variations in the mobility μ per pixel is eliminated.

[Light Emission]

Finally, the write scan circuit 23 decreases the voltage of the gate line WSL from Von to Voff ($T_9$). As a result, the gate of the transistor $T_{Dr}$ floats, the current Ids flows between the drain and the source of the transistor $T_{Dr}$, and the source voltage Vs rises. Consequently, a voltage equal to or higher than the threshold voltage Vel is applied to the organic EL element 12R or the like, and the organic EL element 12R or the like emits light with desired luminance.

In the display device 1 of the present embodiment, in the manner described above, the pixel circuit 13 is on/off controlled in each of the pixels 11, and drive current flows in the organic EL element 12R or the like in each of the pixels 11, so that recombination of holes and electrons occurs and light emits. The light is multiply reflected between the anode and the cathode, passes the cathode or the like, and is taken to the outside. As a result, an image is displayed on the display unit 10.

Figure 12:
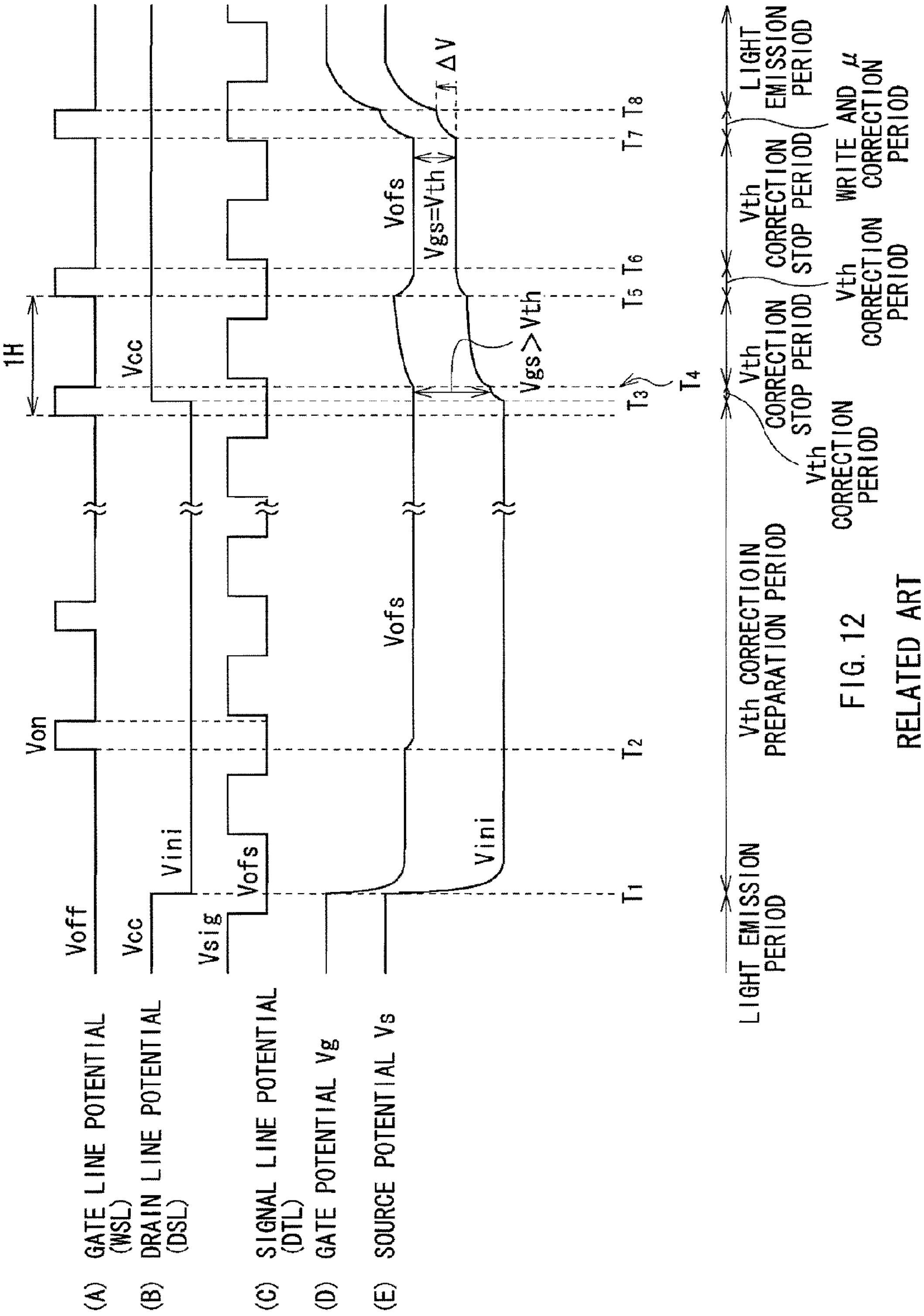
FIG. 12 RELATED ART
FIG. 12 is a waveform chart for explaining an example of the operation of the display device of FIG. 10.

As illustrated in FIG. 12, in the display device 100 according to related art, the source voltage Vs is set to a negative potential in order to cause the potential difference Vgs of the transistor $T_{Dr}$ to exceed Vth in the Vth correction preparation period. Accordingly, the reverse bias is continuously applied to the organic EL element 121R or the like in this period. Although the period in which the reverse bias is continuously applied varies according to the duty ratio of the light-on period and the light-off period (light-on period/light-off period×100), in the case for example where the duty ratio is 25%, the reverse bias is continuously applied to the organic EL element 121R or the like for a period of up to 75% of one cycle.

Generally, the probability of occurrence of breakdown (black dots) when the reverse bias is applied to the organic EL element becomes higher as the magnitude of the reverse bias and application time increase. Therefore, when the reverse bias is continuously applied to the organic EL element 121R or the like for a long time, the possibility that the organic EL element 121R or the like causes the black dots is high, and the yield drop may occur.

On the other hand, in the present embodiment, the three kinds of voltages (Vosf1, Vofs2, and Vsig) are sequentially and periodically applied to the signal line DTL. In the Vth correction preparation period, the transistor $T_{WS}$ is turned on/off when the voltage of the signal line DTL is Vofs1, so as to increase the gate voltage Vg by ΔV1 and to increase the source voltage Vs by ΔV2. In addition, before the Vth correction starts, the transistor $T_{WS}$ is turned on when the voltage of the signal line DTL is Vofs2, and thus the gate voltage Vg is decreased by ΔV1 and the source voltage Vs is also decreased by ΔV2. Thereby, the source voltage Vs is set to a voltage higher than Vini for a predetermined time (in the period in which the gate voltage Vg is Vofs1) in the Vth correction preparation period. Therefore, as compared with the case where the source voltage Vs is Vini in the Vth correction preparation period (refer to FIG. 13), the period in which the source voltage Vs is Vini is shorter. In addition, for the predetermined time (in which the gate voltage Vg is Vofs1) in the Vth correction preparation period, the reverse bias applied to the organic EL element 12R or the like is decreased by ΔV2. Therefore, the possibility of the occurrence of the black dots is reduced.

MODULE AND APPLICATION EXAMPLES

Now, application examples of the display device 1 described in the foregoing embodiment will be described below. The display device 1 of the foregoing embodiment is applicable to a display device of an electronic device in every field for displaying a video signal input from the outside or a video signal generated internally as an image or a video image, such as a television device, a digital camera, a notebook-sized personal computer, a portable terminal device such as a cellular phone, a video camera, or the like.

[Module]

Figure 4:
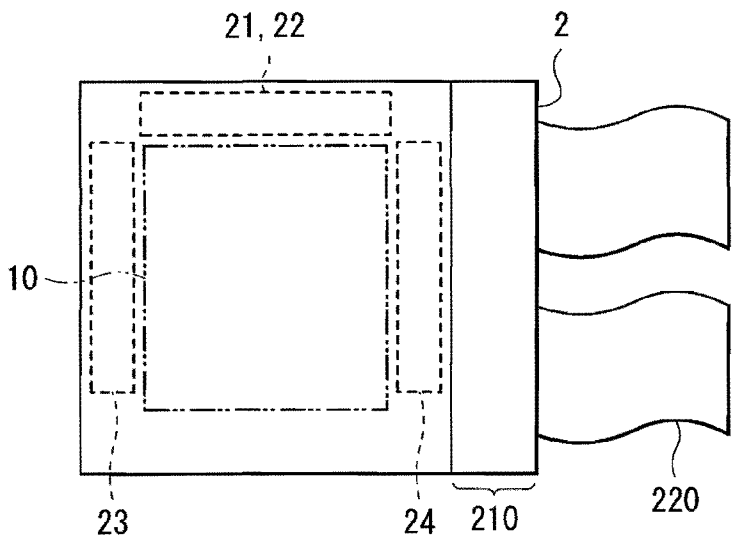
FIG. 4 is a plan view illustrating a schematic configuration of a module including the display device of the embodiment.

The display device 1 of the foregoing embodiment is incorporated into various electronic devices such as application examples 1 to 5, which will be described later, as a module illustrated in FIG. 4 for example. The module is obtained by, for example, providing a region 210 exposed from a member (not illustrated) sealing the display unit 10 on one side of a substrate 2 and forming external connection terminals (not illustrated) in the exposed region 210 by extending lines of the timing control circuit 21, the horizontal drive circuit 22, the write scan circuit 24, and the power source scan circuit 24. The external connection terminal may be provided with a flexible printed circuit (FPC) 220 for inputting/outputting signals.

Application Example 1

Figure 5:
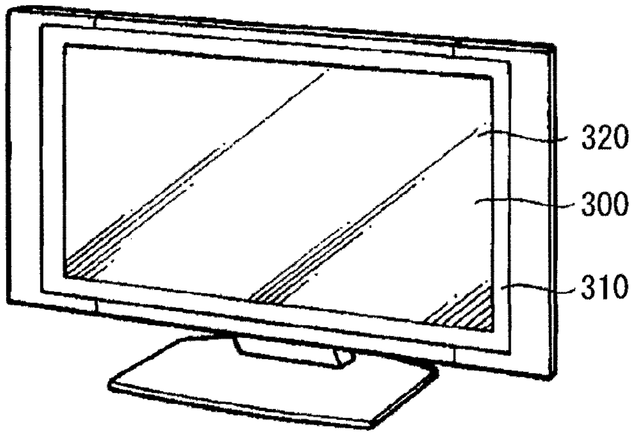
FIG. 5 is a perspective view illustrating the appearance of application example 1 of the display device of the embodiment.

FIG. 5 illustrates the appearance of a television device to which the display device 1 of the embodiment is applied. The television device has, for example, a video display screen unit 300 including a front panel 310 and a filter glass 320. The video display screen unit 300 includes the display device 1 of the embodiment.

Application Example 2

Figure 6A:
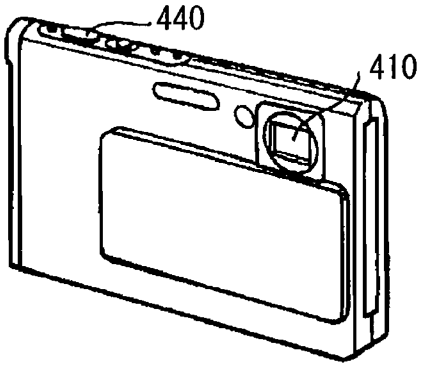
FIG. 6A is a perspective view illustrating the appearance from the front side of application example 2.
Figure 6B:
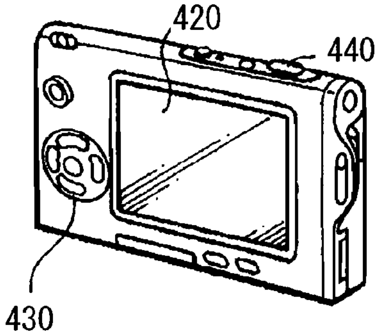
FIG. 6B is a perspective view illustrating the appearance from the back side.

FIGS. 6A and 6B illustrate the appearance of a digital camera to which the display device 1 of the embodiment is applied. The digital camera has, for example, a light emitting unit 410 for flash, a display unit 420, a menu switch 430, and a shutter release button 440. The display unit 420 includes the display device 1 of the embodiment.

Application Example 3

Figure 7:
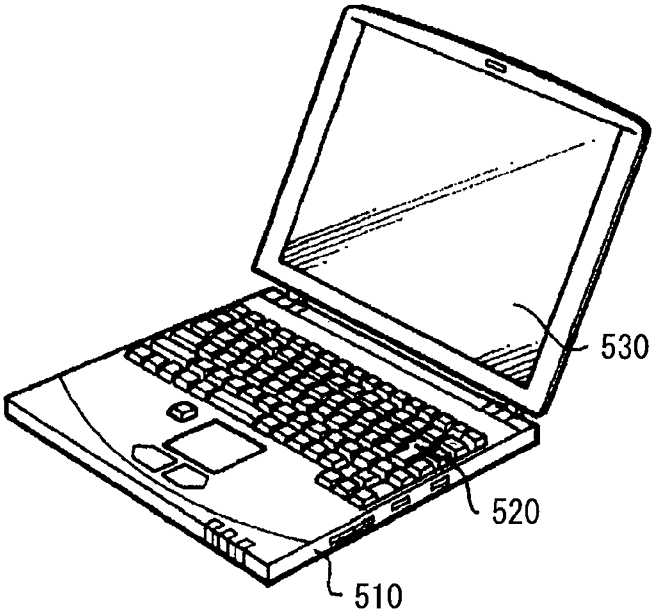
FIG. 7 is a perspective view illustrating the appearance of application example 3.

FIG. 7 illustrates the appearance of a notebook-sized personal computer to which the display device 1 of the embodiment is applied. The notebook-sized personal computer has, for example, a body 510, a keyboard 520 for input-manipulation of characters and the like, and a display unit 530 for displaying an image. The display unit 530 includes the display device 1 of the embodiment.

Application Example 4

Figure 8:
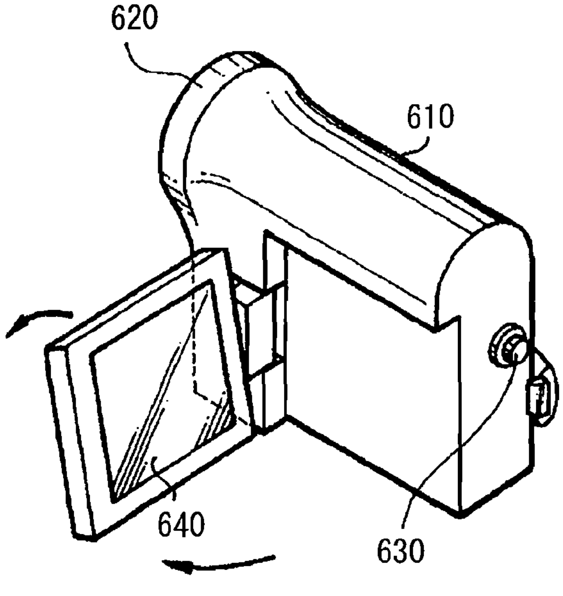
FIG. 8 is a perspective view illustrating the appearance of application example 4.
Figures 9A, 9B, 9C, 9D, 9E, 9F, 9G:
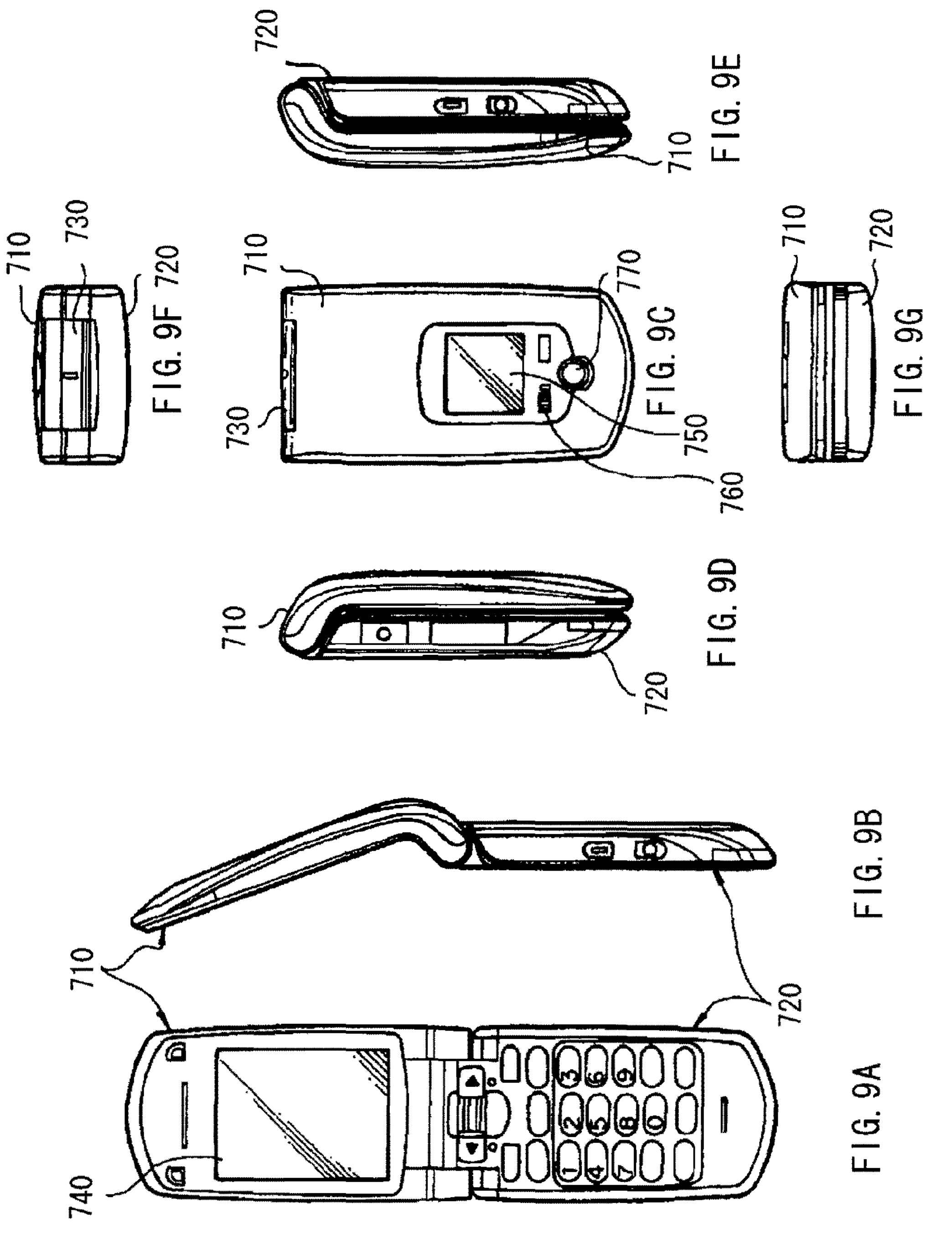
FIG. 9A is a front view in an open state of application example 5.
FIG. 9B is a side view in the open state.
FIG. 9C is a front view in a closed state.
FIG. 9D is a left side view.
FIG. 9E is a right side view.
FIG. 9F is a top view.
FIG. 9G is a bottom view.
Figure 10:
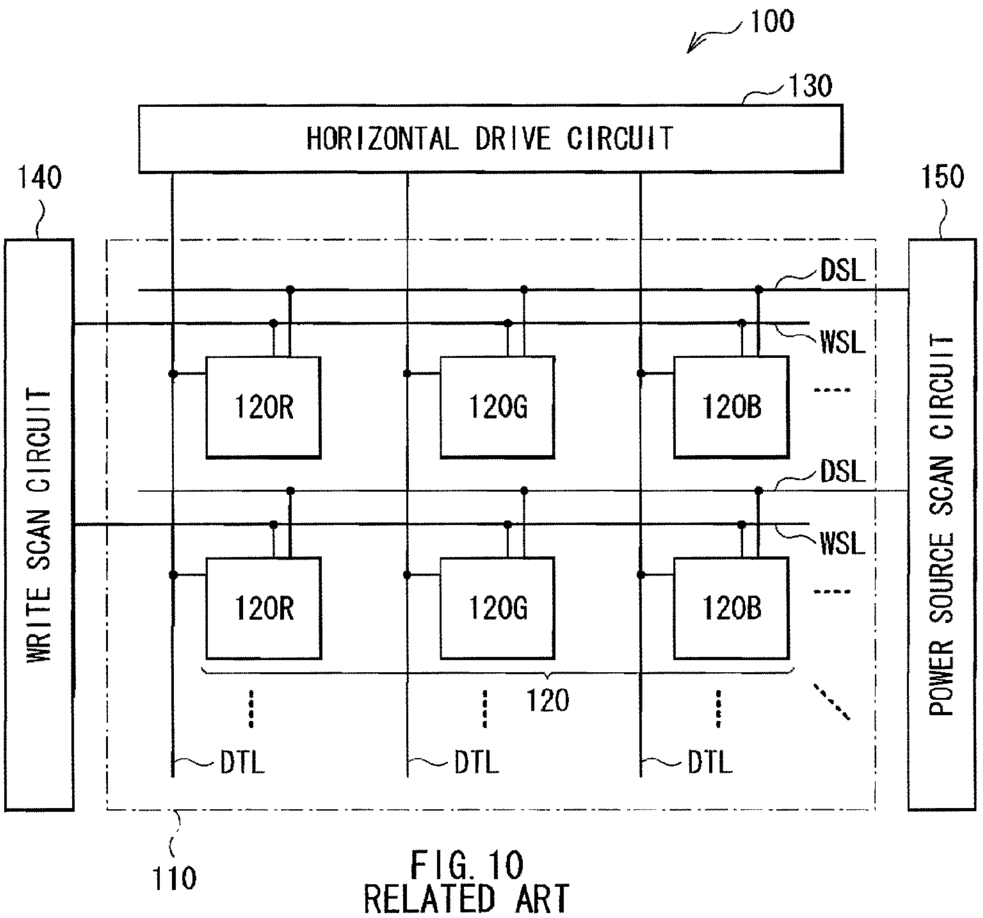
FIG. 10 RELATED ART
FIG. 10 illustrates an example of a configuration of a conventional display device according to related art.
Figure 11:
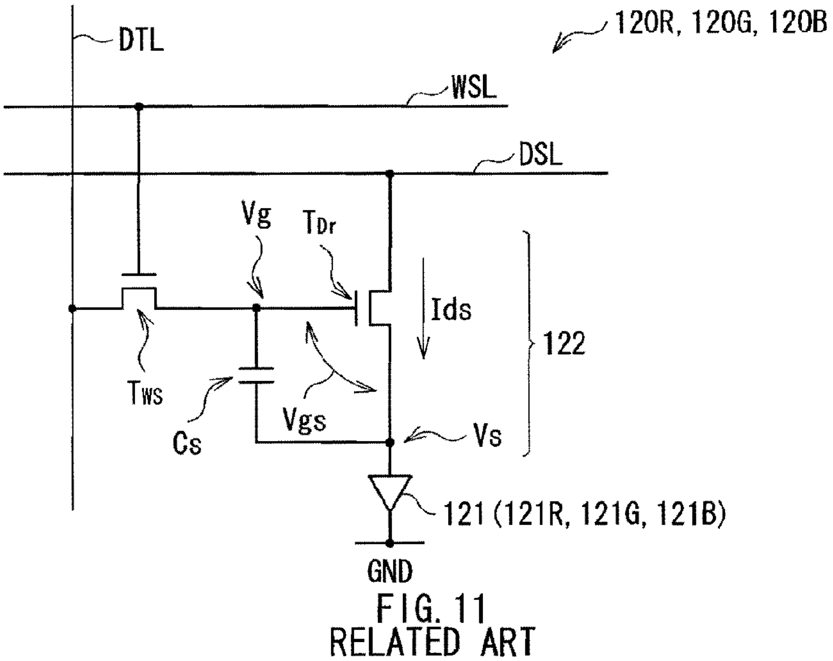
FIG. 11 RELATED ART
FIG. 11 illustrates an example of an internal configuration of a pixel in FIG. 10.

FIG. 8 illustrates the appearance of a video camera to which the display device 1 of the embodiment is applied.

The video camera has, for example, a body 610, a lens 620 provided in a front face of the body 610 for capturing a subject, a shooting start/stop switch 630, and a display unit 640. The display unit 640 includes the display device 1 of the embodiment.

Application Example 5

FIGS. 9A to 9G illustrate the appearance of a cellular phone to which the display device 1 of the embodiment is applied. The cellular phone, for example, couples an upper casing 710 and a lower casing 720 by a coupling part (hinge) 730, and has a display 740, a sub-display 750, a picture light 760, and a camera 770. The display 740 or the sub-display 750 includes the display device 1 of the embodiment.

Although the present invention has been described above with reference to the embodiment and the application examples, the present invention is not limited to the embodiment etc. but may be variously modified.

For example, in the embodiment etc., the case in which the display device 1 is based on an active matrix type has been described. However, the configuration of the pixel circuit 13 for active matrix drive is not limited to that described in the foregoing embodiment etc. As necessary, a capacitive element, a transistor and so forth may be added to the pixel circuit 13. In this case, according to the modification in the pixel circuit 13, a necessary drive circuit may be provided in addition to the horizontal drive circuit 22, the write scan circuit 23, and the power source scan circuit 24.

In addition, in the embodiment etc., the driving of the horizontal drive circuit 22, the write scan circuit 23, and the power source scan circuit 24 is controlled by the signal retention control circuit 21B. However, the driving of those circuits may be controlled by another circuit. Also, the control of the horizon drive circuit 22, the write scan circuit 23, and the power source scan circuit 24 may be performed by hardware (circuit) or software (program).

The present application contains subject matter related to that disclosed in Japanese Patent Application JP 2008-185500 filed in the Japan Patent Office on Jul. 17, 2008, the entire content of which is hereby incorporated by reference.

Obviously many modifications and variations of the present invention are possible in the light of the above teachings. It is therefore to be understood that within the scope of the appended claims the invention may be practiced otherwise than as specifically described.

What is claimed is:

1. A display device comprising a display unit including:

a plurality of light emitting elements; and a plurality of pixel driving circuits, each of the pixel driving circuits including a drive transistor configured to provide a driving current to a corresponding one of the light emitting elements such luminance intensity of the light emitting element is dependent on a luminance signal, wherein, each of the pixel driving circuit is driven such that (a) an anode electrode of the driving transistor is sequentially set to a first potential, a second potential, and a third potential, (b) the first potential is higher than the second potential, and the third potential is a potential which causes the light emitting element to emit light based on the luminance signal, (c) the first potential is supplied before a preparation period for light emission and within a period in which the light emitting element is turned off, and (d) a difference between the first potential and the second potential is large enough to reduce a probability of occurrence of breakdown on the light emitting element.

2. The display device according to claim 1, wherein a cathode electrode of the light emitting element is set to a cathode potential which is not higher than the first potential.

3. The display device according to claim 2, wherein the light emitting element is set in a reverse-biased state in the preparation period.

4. The display device according to claim 2, wherein each of the pixel driving circuits is driven such that a threshold correction operation for the driving transistor is executed during the preparation period.

5. The display device according to claim 1, wherein an application period of the first potential is longer than the preparation period during which the second potential is applied to the anode electrode.

6. The display device according to claim 5, wherein a difference between length of the application period and length of the preparation period is large enough to reduce the probability of occurrence of breakdown on the light emitting element.

7. The display device according to claim 1, wherein:

each of the pixel driving circuits further includes a sampling transistor configured to sample a signal potential based on the luminance signal, and wherein the anode electrode of the driving transistor is sequentially set to the first potential, the second potential and the third potential based on potentials provided for a control node of the drive transistor via the sampling transistor.

8. The display device according to claim 7, wherein each of the pixel driving circuits further includes a capacitor configured to store a voltage based on the luminance signal, the capacitor being connected between the anode electrode and the sampling transistor so as to reflect the potentials provided via the sampling transistor to the potential of the anode electrode.

9. The display device according to claim 1, wherein each of the light emitting elements includes an organic EL element.

10. The display device according to claim 1, wherein the light emitting elements includes a first light emitting element configured to emit light of a first color and a second light emitting element configured to emit light of a second color which is different from the first color.

11. A light emitting device including:

a light emitting element; and a driving circuit including a drive transistor configured to provide a driving current to the light emitting element such that luminance intensity of the light emitting element is dependent on a luminance signal, wherein, the driving circuit is driven such that (a) an anode electrode of the driving transistor is sequentially set to a first potential, a second potential, and a third potential, (b) the first potential is higher than the second potential, and the third potential is a potential which causes the light emitting element to emit light based on the luminance signal, (c) the first potential is supplied before a preparation period for light emission and within a period in which the light emitting element is turned off, and (d) a difference between the first potential and the second potential is large enough to reduce a probability of occurrence of breakdown on the light emitting element.

12. The light emitting device according to claim 11, wherein a cathode electrode of the light emitting element is set to a cathode potential which is not higher than the first potential.

13. The light emitting device according to claim 12, wherein the light emitting element is set in a reverse-biased state in the preparation period.

14. The light emitting device according to claim 12, wherein the driving circuit is driven such that a threshold correction operation for the driving transistor is executed during the preparation period.

15. The light emitting device according to claim 11, wherein an application period of the first potential is longer than the preparation period during which the second potential is applied to the anode electrode.

16. The light emitting device according to claim 15, wherein a difference between length of the application period and length of the preparation period is large enough to reduce the probability of occurrence of breakdown on the light emitting element.

17. The light emitting device according to claim 11, wherein, the driving circuit further includes a sampling transistor configured to sample a signal potential based on the luminance signal, and wherein the anode electrode of the driving transistor is sequentially set to the first potential, the second potential and the third potential based on potentials provided via the sampling transistor.

18. The light emitting device according to claim 17, wherein, the driving circuits further include a capacitor configured to store a voltage based on the luminance signal, and wherein the capacitor is connected between the anode electrode and the sampling transistor so as to reflect the potentials provided via the sampling transistor to the potential of the anode electrode.

19. The light emitting device according to claim 11, wherein the light emitting element includes an organic EL element.

20. An electronic device comprising a plurality of the light emitting devices according to claim 11.

21. The electronic device according to claim 20, wherein each of the light emitting devices is configured to emit light of different colors each other.

22. The electronic device according to claim 20, wherein the light emitting devices are arranged in a matrix form.

* * * * *